US011032330B2

(12) United States Patent
Lawson et al.

(10) Patent No.: US 11,032,330 B2
(45) **Date of Patent: *Jun. 8, 2021**

(54) METHOD FOR PROCESSING TELEPHONY SESSIONS OF A NETWORK

(71) Applicant: Twilio Inc., San Francisco, CA (US)

(72) Inventors: Jeffrey Lawson, San Francisco, CA (US); John Wolthuis, San Francisco, CA (US); Evan Cooke, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,956

(22) Filed: Apr. 17, 2020

(65) Prior Publication Data

US 2020/0244712 A1 Jul. 30, 2020

Related U.S. Application Data

(63) Continuation of application No. 16/279,280, filed on Feb. 19, 2019, now Pat. No. 10,708,317, which is a (Continued)

(51) Int. Cl.

*H04J 1/16* (2006.01)
*H04L 29/06* (2006.01)
*H04L 29/12* (2006.01)

(52) U.S. Cl.

CPC ........ *H04L 65/1069* (2013.01); *H04L 61/106* (2013.01); *H04L 65/4053* (2013.01)

(58) Field of Classification Search

None

See application file for complete search history.

(56) References Cited

U.S. PATENT DOCUMENTS 5,274,700 A 12/1993 Gechter et al.
5,526,416 A 6/1996 Dezonno et al.
(Continued)

FOREIGN PATENT DOCUMENTS

DE 1684587 A1 3/1971
EP 0282126 A2 9/1988
(Continued)

OTHER PUBLICATIONS

U.S. Appl. No. 13/021,645 U.S. Pat. No. 8,649,268, filed Feb. 4, 2011, Method for Processing Telephony Sessions of a Network.
(Continued)

*Primary Examiner* — Kwang B Yao
*Assistant Examiner* — Juvena W Loo
(74) *Attorney, Agent, or Firm* — Schwegman Lundberg & Woessner, P.A.

(57) ABSTRACT

A method for processing telephony sessions of a network including at least one application server and a call router, the method including the steps of assigning a primary Uniform Resource Identifier (URI) and at least a secondary URI to an application; mapping a telephony session to the primary URI; communicating with the application server designated by the primary URI using an application layer protocol; receiving telephony instructions from the application server and processing the telephony instructions with the call router; detecting an application event; and upon detecting the application event, communicating with the application server designated by the secondary URI.

20 Claims, 6 Drawing Sheets

Related U.S. Application Data continuation of application No. 15/841,481, filed on Dec. 14, 2017, now Pat. No. 10,230,772, which is a continuation of application No. 15/241,504, filed on Aug. 19, 2016, now Pat. No. 9,882,942, which is a continuation of application No. 14/176,426, filed on Feb. 10, 2014, now Pat. No. 9,455,949, which is a continuation of application No. 13/021,645, filed on Feb. 4, 2011, now Pat. No. 8,649,268.

(56) References Cited

U.S. PATENT DOCUMENTS

| | | | |
|---|---|---|---|
| 5,581,608 | A | 12/1996 | Jreij et al. |
| 5,598,457 | A | 1/1997 | Foladare et al. |
| 5,867,495 | A | 2/1999 | Elliott et al. |
| 5,934,181 | A | 8/1999 | Adamczewski |
| 5,978,465 | A | 11/1999 | Corduroy et al. |
| 6,026,440 | A | 2/2000 | Shrader et al. |
| 6,034,946 | A | 3/2000 | Roginsky et al. |
| 6,094,681 | A | 7/2000 | Shaffer et al. |
| 6,138,143 | A | 10/2000 | Gigliotti et al. |
| 6,185,565 | B1 | 2/2001 | Meubus et al. |
| 6,192,123 | B1 | 2/2001 | Grunsted et al. |
| 6,206,564 | B1 | 3/2001 | Adamczewski |
| 6,223,287 | B1 | 4/2001 | Douglas et al. |
| 6,232,979 | B1 | 5/2001 | Shochet |
| 6,269,336 | B1 | 7/2001 | Ladd et al. |
| 6,317,137 | B1 | 11/2001 | Rosasco |
| 6,363,065 | B1 | 3/2002 | Thornton et al. |
| 6,373,836 | B1 | 4/2002 | Deryugin et al. |
| 6,425,012 | B1 | 7/2002 | Trovato et al. |
| 6,426,995 | B1 | 7/2002 | Kim et al. |
| 6,430,175 | B1 | 8/2002 | Echols et al. |
| 6,434,528 | B1 | 8/2002 | Sanders |
| 6,442,159 | B2 | 8/2002 | Josse et al. |
| 6,445,694 | B1 | 9/2002 | Swartz |
| 6,445,776 | B1 | 9/2002 | Shank et al. |
| 6,459,913 | B2 | 10/2002 | Cloutier |
| 6,463,414 | B1 | 10/2002 | Su et al. |
| 6,493,558 | B1 | 12/2002 | Bernhart et al. |
| 6,496,500 | B2 | 12/2002 | Nance et al. |
| 6,501,739 | B1 | 12/2002 | Cohen |
| 6,501,832 | B1 | 12/2002 | Saylor et al. |
| 6,507,875 | B1 | 1/2003 | Mellen-Garnett et al. |
| 6,571,245 | B2 | 5/2003 | Huang et al. |
| 6,574,216 | B1 | 6/2003 | Farris et al. |
| 6,577,721 | B1 | 6/2003 | Vainio et al. |
| 6,600,736 | B1 | 7/2003 | Ball et al. |
| 6,606,596 | B1 | 8/2003 | Zirngibl et al. |
| 6,614,783 | B1 | 9/2003 | Sonesh et al. |
| 6,625,258 | B1 | 9/2003 | Ram et al. |
| 6,625,576 | B2 | 9/2003 | Kochanski et al. |
| 6,636,504 | B1 | 10/2003 | Albers et al. |
| 6,662,231 | B1 | 12/2003 | Drosset et al. |
| 6,704,785 | B1 | 3/2004 | Koo et al. |
| 6,707,811 | B2 | 3/2004 | Greenberg et al. |
| 6,707,889 | B1 | 3/2004 | Saylor et al. |
| 6,707,899 | B2 | 3/2004 | Saito et al. |
| 6,711,129 | B1 | 3/2004 | Bauer et al. |
| 6,711,249 | B2 | 3/2004 | Weissman et al. |
| 6,738,738 | B2 | 5/2004 | Henton |
| 6,757,365 | B1 | 6/2004 | Bogard |
| 6,765,997 | B1 | 7/2004 | Zirngibl et al. |
| 6,768,788 | B1 | 7/2004 | Langseth et al. |
| 6,771,955 | B2 | 8/2004 | Imura et al. |
| 6,778,653 | B1 | 8/2004 | Kallas et al. |
| 6,785,266 | B2 | 8/2004 | Swartz |
| 6,788,768 | B1 | 9/2004 | Saylor et al. |
| 6,792,086 | B1 | 9/2004 | Saylor et al. |
| 6,792,093 | B2 | 9/2004 | Barak et al. |
| 6,798,867 | B1 | 9/2004 | Zirngibl et al. |
| 6,807,529 | B2 | 10/2004 | Johnson et al. |
| 6,807,574 | B1 | 10/2004 | Partovi et al. |
| 6,819,667 | B1 | 11/2004 | Brusilovsky et al. |
| 6,820,260 | B1 | 11/2004 | Flockhart et al. |
| 6,829,334 | B1 | 12/2004 | Zirngibl et al. |
| 6,831,966 | B1 | 12/2004 | Tegan et al. |
| 6,834,265 | B2 | 12/2004 | Balasuriya |
| 6,836,537 | B1 | 12/2004 | Zirngibl et al. |
| 6,842,767 | B1 | 1/2005 | Partovi et al. |
| 6,850,603 | B1 | 2/2005 | Eberle et al. |
| 6,870,830 | B1 | 3/2005 | Schuster et al. |
| 6,873,952 | B1 | 3/2005 | Bailey et al. |
| 6,874,084 | B1 | 3/2005 | Dobner et al. |
| 6,885,737 | B1 | 4/2005 | Gao et al. |
| 6,888,929 | B1 | 5/2005 | Saylor et al. |
| 6,895,084 | B1 | 5/2005 | Saylor et al. |
| 6,898,567 | B2 | 5/2005 | Balasuriya |
| 6,912,581 | B2 | 6/2005 | Johnson et al. |
| 6,922,411 | B1 | 7/2005 | Taylor |
| 6,928,469 | B1 | 8/2005 | Duursma et al. |
| 6,931,405 | B2 | 8/2005 | El-shimi et al. |
| 6,937,699 | B1 | 8/2005 | Schuster et al. |
| 6,940,953 | B1 | 9/2005 | Eberle et al. |
| 6,941,268 | B2 | 9/2005 | Porter et al. |
| 6,947,417 | B2 | 9/2005 | Laursen et al. |
| 6,947,988 | B1 | 9/2005 | Saleh et al. |
| 6,961,330 | B1 | 11/2005 | Cattan et al. |
| 6,964,012 | B1 | 11/2005 | Zirngibl et al. |
| 6,970,915 | B1 | 11/2005 | Partovi et al. |
| 6,977,992 | B2 | 12/2005 | Zirngibl et al. |
| 6,981,041 | B2 | 12/2005 | Araujo et al. |
| 6,985,862 | B2 | 1/2006 | Strom et al. |
| 6,999,576 | B2 | 2/2006 | Sacra |
| 7,003,464 | B2 | 2/2006 | Ferrans et al. |
| 7,006,606 | B1 | 2/2006 | Cohen et al. |
| 7,010,586 | B1 | 3/2006 | Allavarpu et al. |
| 7,020,685 | B1 | 3/2006 | Chen et al. |
| 7,039,165 | B1 | 5/2006 | Saylor et al. |
| 7,046,778 | B2 | 5/2006 | Martin et al. |
| 7,058,042 | B2 | 6/2006 | Bontempi et al. |
| 7,058,181 | B2 | 6/2006 | Wright et al. |
| 7,062,709 | B2 | 6/2006 | Cheung |
| 7,065,637 | B1 | 6/2006 | Nanja |
| 7,076,037 | B1 | 7/2006 | Gonen et al. |
| 7,076,428 | B2 | 7/2006 | Anastasakos et al. |
| 7,089,310 | B1 | 8/2006 | Ellerman et al. |
| 7,099,442 | B2 | 8/2006 | Da Palma et al. |
| 7,103,003 | B2 | 9/2006 | Brueckheimer et al. |
| 7,103,171 | B1 | 9/2006 | Annadata et al. |
| 7,106,844 | B1 | 9/2006 | Holland |
| 7,111,163 | B1 | 9/2006 | Haney |
| 7,136,932 | B1 | 11/2006 | Schneider |
| 7,140,004 | B1 | 11/2006 | Kunins et al. |
| 7,142,662 | B2 | 11/2006 | Rodenbusch et al. |
| 7,143,039 | B1 | 11/2006 | Stifelman et al. |
| 7,197,331 | B2 | 3/2007 | Anastasakos et al. |
| 7,197,461 | B1 | 3/2007 | Eberle et al. |
| 7,197,462 | B2 | 3/2007 | Takagi et al. |
| 7,197,544 | B2 | 3/2007 | Wang et al. |
| D540,074 | S | 4/2007 | Peters |
| 7,225,232 | B2 | 5/2007 | Elberse |
| 7,227,849 | B1 | 6/2007 | Rasanen |
| 7,231,035 | B2 | 6/2007 | Walker et al. |
| 7,245,611 | B2 | 7/2007 | Narasimhan et al. |
| 7,260,208 | B2 | 8/2007 | Cavalcanti |
| 7,266,181 | B1 | 9/2007 | Zirngibl et al. |
| 7,269,557 | B1 | 9/2007 | Bailey et al. |
| 7,272,212 | B2 | 9/2007 | Eberle et al. |
| 7,272,564 | B2 | 9/2007 | Phillips et al. |
| 7,277,851 | B1 | 10/2007 | Henton |
| 7,283,515 | B2 | 10/2007 | Fowler |
| 7,283,519 | B2 | 10/2007 | Girard |
| 7,286,521 | B1 | 10/2007 | Jackson et al. |
| 7,287,248 | B1 | 10/2007 | Adeeb |
| 7,289,453 | B2 | 10/2007 | Riedel et al. |
| 7,296,739 | B1 | 11/2007 | Mo et al. |
| 7,298,732 | B2 | 11/2007 | Cho |
| 7,298,830 | B2 | 11/2007 | Guedalia et al. |
| 7,298,834 | B1 | 11/2007 | Homeier et al. |
| 7,308,085 | B2 | 12/2007 | Weissman |
| 7,308,408 | B1 | 12/2007 | Stifelman et al. |
| 7,324,633 | B2 | 1/2008 | Gao et al. |
| 7,324,942 | B1 | 1/2008 | Mahowald et al. |

(56) References Cited

U.S. PATENT DOCUMENTS

| | | | |
|---|---|---|---|
| 7,328,263 | B1 | 2/2008 | Sadjadi |
| 7,330,463 | B1 | 2/2008 | Bradd et al. |
| 7,330,890 | B1 | 2/2008 | Partovi et al. |
| 7,340,040 | B1 | 3/2008 | Saylor et al. |
| 7,349,714 | B2 | 3/2008 | Lee et al. |
| 7,369,865 | B2 | 5/2008 | Gabriel et al. |
| 7,370,329 | B2 | 5/2008 | Kumar et al. |
| 7,373,660 | B1 | 5/2008 | Guichard et al. |
| 7,376,223 | B2 | 5/2008 | Taylor et al. |
| 7,376,586 | B1 | 5/2008 | Partovi et al. |
| 7,376,733 | B2 | 5/2008 | Connelly et al. |
| 7,376,740 | B1 | 5/2008 | Porter et al. |
| 7,412,525 | B2 | 8/2008 | Cafarella et al. |
| 7,418,090 | B2 | 8/2008 | Reding et al. |
| 7,426,750 | B2 | 9/2008 | Cooper et al. |
| 7,428,302 | B2 | 9/2008 | Zirngibl et al. |
| 7,440,898 | B1 | 10/2008 | Eberle et al. |
| 7,447,299 | B1 | 11/2008 | Partovi et al. |
| 7,454,459 | B1 | 11/2008 | Kapoor et al. |
| 7,457,249 | B2 | 11/2008 | Baldwin et al. |
| 7,457,397 | B1 | 11/2008 | Saylor et al. |
| 7,473,872 | B2 | 1/2009 | Takimoto |
| 7,486,780 | B2 | 2/2009 | Zirngibl et al. |
| 7,496,054 | B2 | 2/2009 | Taylor |
| 7,496,188 | B2 | 2/2009 | Saha et al. |
| 7,496,651 | B1 | 2/2009 | Joshi |
| 7,500,249 | B2 | 3/2009 | Kampe et al. |
| 7,505,951 | B2 | 3/2009 | Thompson et al. |
| 7,519,359 | B2 | 4/2009 | Chiarulli et al. |
| 7,522,711 | B1 | 4/2009 | Stein et al. |
| 7,536,454 | B2 | 5/2009 | Balasuriya |
| 7,542,761 | B2 | 6/2009 | Sarkar |
| 7,552,054 | B1 | 6/2009 | Stifelman et al. |
| 7,571,226 | B1 | 8/2009 | Partovi et al. |
| 7,606,868 | B1 | 10/2009 | Le et al. |
| 7,613,287 | B1 | 11/2009 | Stifelman et al. |
| 7,623,648 | B1 | 11/2009 | Oppenheim et al. |
| 7,630,900 | B1 | 12/2009 | Strom |
| 7,631,310 | B1 | 12/2009 | Henzinger |
| 7,644,000 | B1 | 1/2010 | Strom |
| 7,657,433 | B1 | 2/2010 | Chang |
| 7,657,434 | B2 | 2/2010 | Thompson et al. |
| 7,668,157 | B2 | 2/2010 | Weintraub et al. |
| 7,672,275 | B2 | 3/2010 | Yajnik et al. |
| 7,672,295 | B1 | 3/2010 | Andhare et al. |
| 7,675,857 | B1 | 3/2010 | Chesson |
| 7,676,221 | B2 | 3/2010 | Roundtree et al. |
| 7,685,280 | B2 | 3/2010 | Berry et al. |
| 7,685,298 | B2 | 3/2010 | Day et al. |
| 7,715,547 | B2 | 5/2010 | Ibbotson et al. |
| 7,716,293 | B2 | 5/2010 | Kasuga et al. |
| 7,742,499 | B1 | 6/2010 | Erskine et al. |
| 7,779,065 | B2 | 8/2010 | Gupta et al. |
| 7,809,125 | B2 | 10/2010 | Brunson et al. |
| 7,809,791 | B2 | 10/2010 | Schwartz et al. |
| 7,875,836 | B2 | 1/2011 | Imura et al. |
| 7,882,253 | B2 | 2/2011 | Pardo-Castellote et al. |
| 7,920,866 | B2 | 4/2011 | Bosch et al. |
| 7,926,099 | B1 | 4/2011 | Chakravarty et al. |
| 7,929,562 | B2 | 4/2011 | Petrovykh |
| 7,936,867 | B1 | 5/2011 | Hill et al. |
| 7,949,111 | B2 | 5/2011 | Harlow et al. |
| 7,962,644 | B1 | 6/2011 | Ezerzer et al. |
| 7,979,555 | B2 | 7/2011 | Rothstein et al. |
| 7,992,120 | B1 | 8/2011 | Wang et al. |
| 8,023,425 | B2 | 9/2011 | Raleigh |
| 8,024,785 | B2 | 9/2011 | Andress et al. |
| 8,045,689 | B2 | 10/2011 | Provenzale et al. |
| 8,046,378 | B1 | 10/2011 | Zhuge et al. |
| 8,046,823 | B1 | 10/2011 | Begen et al. |
| 8,069,096 | B1 | 11/2011 | Ballaro et al. |
| 8,078,483 | B1 | 12/2011 | Hirose et al. |
| 8,081,744 | B2 | 12/2011 | Sylvain |
| 8,081,958 | B2 | 12/2011 | Soderstrom et al. |
| 8,103,725 | B2 | 1/2012 | Gupta et al. |
| 8,126,128 | B1 | 2/2012 | Hicks, III et al. |
| 8,126,129 | B1 | 2/2012 | Mcguire |
| 8,130,750 | B2 | 3/2012 | Hester |
| 8,130,917 | B2 | 3/2012 | Helbling et al. |
| 8,139,730 | B2 | 3/2012 | Da Palma et al. |
| 8,145,212 | B2 | 3/2012 | Lopresti et al. |
| 8,149,716 | B2 | 4/2012 | Ramanathan et al. |
| 8,150,918 | B1 | 4/2012 | Edelman et al. |
| 8,156,213 | B1 | 4/2012 | Deng et al. |
| 8,165,116 | B2 | 4/2012 | Ku et al. |
| 8,166,185 | B2 | 4/2012 | Samuel et al. |
| 8,169,936 | B2 | 5/2012 | Koren et al. |
| 8,175,007 | B2 | 5/2012 | Jain et al. |
| 8,185,619 | B1 | 5/2012 | Maiocco et al. |
| 8,190,670 | B2 | 5/2012 | Gavrilescu et al. |
| 8,196,133 | B2 | 6/2012 | Kakumani et al. |
| 8,204,479 | B2 | 6/2012 | Vendrow et al. |
| 8,214,868 | B2 | 7/2012 | Hamilton et al. |
| 8,218,457 | B2 | 7/2012 | Malhotra et al. |
| 8,233,611 | B1 | 7/2012 | Zettner |
| 8,238,533 | B2 | 8/2012 | Blackwell et al. |
| 8,243,889 | B2 | 8/2012 | Taylor et al. |
| 8,249,552 | B1 | 8/2012 | Gailloux et al. |
| 8,266,327 | B2 | 9/2012 | Kumar et al. |
| 8,295,272 | B2 | 10/2012 | Boni et al. |
| 8,301,117 | B2 | 10/2012 | Keast et al. |
| 8,306,021 | B2 | 11/2012 | Lawson et al. |
| 8,315,198 | B2 | 11/2012 | Corneille et al. |
| 8,315,369 | B2 | 11/2012 | Lawson et al. |
| 8,315,620 | B1 | 11/2012 | Williamson et al. |
| 8,319,816 | B1 | 11/2012 | Swanson et al. |
| 8,326,805 | B1 | 12/2012 | Arous et al. |
| 8,335,852 | B2 | 12/2012 | Hokimoto |
| 8,346,630 | B1 | 1/2013 | Mckeown |
| 8,355,394 | B2 | 1/2013 | Taylor et al. |
| 8,411,669 | B2 | 4/2013 | Chen et al. |
| 8,413,247 | B2 | 4/2013 | Hudis et al. |
| 8,417,817 | B1 | 4/2013 | Jacobs |
| 8,429,827 | B1 | 4/2013 | Wetzel |
| 8,438,315 | B1 | 5/2013 | Tao et al. |
| 8,462,670 | B2 | 6/2013 | Chien |
| 8,467,502 | B2 | 6/2013 | Sureka et al. |
| 8,477,926 | B2 | 7/2013 | Jasper et al. |
| 8,503,639 | B2 | 8/2013 | Reding et al. |
| 8,503,650 | B2 | 8/2013 | Reding et al. |
| 8,504,818 | B2 | 8/2013 | Rao et al. |
| 8,509,068 | B2 | 8/2013 | Begall et al. |
| 8,532,686 | B2 | 9/2013 | Schmidt et al. |
| 8,533,857 | B2 | 9/2013 | Tuchman et al. |
| 8,542,805 | B2 | 9/2013 | Agranovsky et al. |
| 8,543,665 | B2 | 9/2013 | Ansari et al. |
| 8,547,962 | B2 | 10/2013 | Ramachandran, Sr. et al. |
| 8,549,047 | B2 | 10/2013 | Beechuk et al. |
| 8,565,117 | B2 | 10/2013 | Hilt et al. |
| 8,572,391 | B2 | 10/2013 | Golan et al. |
| 8,576,712 | B2 | 11/2013 | Sabat et al. |
| 8,577,803 | B2 | 11/2013 | Chatterjee et al. |
| 8,582,450 | B1 | 11/2013 | Robesky |
| 8,582,737 | B2 | 11/2013 | Lawson et al. |
| 8,594,626 | B1 | 11/2013 | Woodson et al. |
| 8,601,136 | B1 | 12/2013 | Fahlgren et al. |
| 8,611,338 | B2 | 12/2013 | Lawson et al. |
| 8,613,102 | B2 | 12/2013 | Nath |
| 8,621,598 | B2 | 12/2013 | Lai et al. |
| 8,649,268 | B2 | 2/2014 | Lawson et al. |
| 8,656,452 | B2 | 2/2014 | Li et al. |
| 8,667,056 | B1 | 3/2014 | Proulx et al. |
| 8,675,493 | B2 | 3/2014 | Buddhikot et al. |
| 8,688,147 | B2 | 4/2014 | Nguyen et al. |
| 8,695,077 | B1 | 4/2014 | Gerhard et al. |
| 8,713,693 | B2 | 4/2014 | Shanabrook et al. |
| 8,728,656 | B2 | 5/2014 | Takahashi et al. |
| 8,751,801 | B2 | 6/2014 | Harris et al. |
| 8,755,376 | B2 | 6/2014 | Lawson et al. |
| 8,767,925 | B2 | 7/2014 | Sureka et al. |
| 8,781,975 | B2 | 7/2014 | Bennett et al. |
| 8,797,920 | B2 | 8/2014 | Parreira |
| 8,806,024 | B1 | 8/2014 | Toba Francis et al. |
| 8,819,133 | B2 | 8/2014 | Wang |

(56) References Cited

U.S. PATENT DOCUMENTS

| | | | |
|---|---|---|---|
| 8,825,746 | B2 | 9/2014 | Ravichandran et al. |
| 8,837,465 | B2 | 9/2014 | Lawson et al. |
| 8,838,707 | B2 | 9/2014 | Lawson et al. |
| 8,843,596 | B2 | 9/2014 | Goel et al. |
| 8,855,271 | B2 | 10/2014 | Brock et al. |
| 8,861,510 | B1 | 10/2014 | Fritz |
| 8,879,547 | B2 | 11/2014 | Maes |
| 8,903,938 | B2 | 12/2014 | Vermeulen et al. |
| 8,918,848 | B2 | 12/2014 | Sharma et al. |
| 8,924,489 | B2 | 12/2014 | Bleau et al. |
| 8,938,053 | B2 | 1/2015 | Cooke et al. |
| 8,948,356 | B2 | 2/2015 | Nowack et al. |
| 8,954,591 | B2 | 2/2015 | Ganesan et al. |
| 8,964,726 | B2 | 2/2015 | Lawson et al. |
| 8,990,610 | B2 | 3/2015 | Bostick et al. |
| 9,014,664 | B2 | 4/2015 | Kim et al. |
| 9,015,702 | B2 | 4/2015 | Bhat |
| 9,031,223 | B2 | 5/2015 | Smith et al. |
| 9,032,204 | B2 | 5/2015 | Byrd et al. |
| 9,071,677 | B2 | 6/2015 | Aggarwal et al. |
| 9,137,127 | B2 | 9/2015 | Nowack et al. |
| 9,141,682 | B1 | 9/2015 | Adoc, Jr. et al. |
| 9,161,296 | B2 | 10/2015 | Parsons et al. |
| 9,177,007 | B2 | 11/2015 | Winters et al. |
| 9,204,281 | B2 | 12/2015 | Ramprasad et al. |
| 9,210,275 | B2 | 12/2015 | Lawson et al. |
| 9,306,982 | B2 | 4/2016 | Lawson et al. |
| 9,307,094 | B2 | 4/2016 | Nowack et al. |
| 9,325,624 | B2 | 4/2016 | Malatack et al. |
| 9,338,190 | B2 | 5/2016 | Eng et al. |
| 9,344,573 | B2 | 5/2016 | Wolthuis et al. |
| 9,356,916 | B2 | 5/2016 | Kravitz et al. |
| 9,378,337 | B2 | 6/2016 | Kuhr |
| 9,398,622 | B2 | 7/2016 | Lawson et al. |
| 9,455,949 | B2 | 9/2016 | Lawson et al. |
| 9,456,008 | B2 | 9/2016 | Lawson et al. |
| 9,456,339 | B1 | 9/2016 | Hildner et al. |
| 9,460,169 | B2 | 10/2016 | Hinton et al. |
| 9,596,274 | B2 | 3/2017 | Lawson et al. |
| 9,628,624 | B2 | 4/2017 | Wolthuis et al. |
| 9,632,875 | B2 | 4/2017 | Raichstein et al. |
| 9,634,995 | B2 | 4/2017 | Binder |
| 10,230,772 | B2 | 3/2019 | Lawson et al. |
| 10,708,317 | B2 | 7/2020 | Lawson et al. |
| 2001/0038624 | A1 | 11/2001 | Greenberg et al. |
| 2001/0043684 | A1 | 11/2001 | Guedalia et al. |
| 2001/0051996 | A1 | 12/2001 | Cooper et al. |
| 2002/0006124 | A1 | 1/2002 | Jimenez et al. |
| 2002/0006125 | A1 | 1/2002 | Josse et al. |
| 2002/0006193 | A1 | 1/2002 | Rodenbusch et al. |
| 2002/0025819 | A1 | 2/2002 | Cetusic et al. |
| 2002/0057777 | A1 | 5/2002 | Saito et al. |
| 2002/0064267 | A1 | 5/2002 | Martin et al. |
| 2002/0067823 | A1 | 6/2002 | Walker et al. |
| 2002/0077833 | A1 | 6/2002 | Arons et al. |
| 2002/0126813 | A1 | 9/2002 | Partovi et al. |
| 2002/0133587 | A1 | 9/2002 | Ensel et al. |
| 2002/0136391 | A1 | 9/2002 | Armstrong |
| 2002/0165957 | A1 | 11/2002 | Devoe et al. |
| 2002/0176378 | A1 | 11/2002 | Hamilton et al. |
| 2002/0176404 | A1 | 11/2002 | Girard |
| 2002/0184361 | A1 | 12/2002 | Eden |
| 2002/0198941 | A1 | 12/2002 | Gavrilescu et al. |
| 2003/0006137 | A1 | 1/2003 | Wei et al. |
| 2003/0012356 | A1 | 1/2003 | Zino et al. |
| 2003/0014665 | A1 | 1/2003 | Anderson et al. |
| 2003/0018830 | A1 | 1/2003 | Chen et al. |
| 2003/0023672 | A1 | 1/2003 | Vaysman |
| 2003/0026426 | A1 | 2/2003 | Wright et al. |
| 2003/0046366 | A1 | 3/2003 | Pardikar et al. |
| 2003/0051037 | A1 | 3/2003 | Sundaram et al. |
| 2003/0058884 | A1 | 3/2003 | Kallner et al. |
| 2003/0059020 | A1 | 3/2003 | Meyerson et al. |
| 2003/0060188 | A1 | 3/2003 | Gidron et al. |
| 2003/0061317 | A1 | 3/2003 | Brown et al. |
| 2003/0061404 | A1 | 3/2003 | Atwal et al. |
| 2003/0088421 | A1 | 5/2003 | Maes et al. |
| 2003/0097330 | A1 | 5/2003 | Hillmer et al. |
| 2003/0097447 | A1 | 5/2003 | Johnston |
| 2003/0097639 | A1 | 5/2003 | Niyogi et al. |
| 2003/0103620 | A1 | 6/2003 | Brown et al. |
| 2003/0123640 | A1 | 7/2003 | Roelle et al. |
| 2003/0149721 | A1 | 8/2003 | Alfonso-nogueiro et al. |
| 2003/0162506 | A1 | 8/2003 | Toshimitsu et al. |
| 2003/0195950 | A1 | 10/2003 | Huang et al. |
| 2003/0195990 | A1 | 10/2003 | Greenblat et al. |
| 2003/0196076 | A1 | 10/2003 | Zabarski et al. |
| 2003/0204616 | A1 | 10/2003 | Billhartz et al. |
| 2003/0211842 | A1 | 11/2003 | Kempf et al. |
| 2003/0231647 | A1 | 12/2003 | Petrovykh |
| 2003/0233276 | A1 | 12/2003 | Pearlman et al. |
| 2004/0008635 | A1 | 1/2004 | Nelson et al. |
| 2004/0011690 | A1 | 1/2004 | Marfino et al. |
| 2004/0044953 | A1 | 3/2004 | Watkins et al. |
| 2004/0052349 | A1 | 3/2004 | Creamer et al. |
| 2004/0071275 | A1 | 4/2004 | Bowater et al. |
| 2004/0101122 | A1 | 5/2004 | Da Palma et al. |
| 2004/0102182 | A1 | 5/2004 | Reith et al. |
| 2004/0117788 | A1 | 6/2004 | Karaoguz et al. |
| 2004/0136324 | A1 | 7/2004 | Steinberg et al. |
| 2004/0165569 | A1 | 8/2004 | Sweatman et al. |
| 2004/0172482 | A1 | 9/2004 | Weissman et al. |
| 2004/0199572 | A1 | 10/2004 | Hunt et al. |
| 2004/0205101 | A1 | 10/2004 | Radhakrishnan |
| 2004/0205689 | A1 | 10/2004 | Ellens et al. |
| 2004/0213400 | A1 | 10/2004 | Golitsin et al. |
| 2004/0216058 | A1 | 10/2004 | Chavers et al. |
| 2004/0218748 | A1 | 11/2004 | Fisher |
| 2004/0228469 | A1 | 11/2004 | Andrews et al. |
| 2004/0236696 | A1 | 11/2004 | Aoki et al. |
| 2004/0240649 | A1 | 12/2004 | Goel |
| 2005/0005109 | A1 | 1/2005 | Castaldi et al. |
| 2005/0005200 | A1 | 1/2005 | Matena et al. |
| 2005/0010483 | A1 | 1/2005 | Ling |
| 2005/0015505 | A1 | 1/2005 | Kruis et al. |
| 2005/0021626 | A1 | 1/2005 | Prajapat et al. |
| 2005/0025303 | A1 | 2/2005 | Hostetler, Jr. |
| 2005/0038772 | A1 | 2/2005 | Colrain |
| 2005/0043952 | A1 | 2/2005 | Sharma et al. |
| 2005/0047579 | A1 | 3/2005 | Mansour |
| 2005/0060411 | A1 | 3/2005 | Coulombe et al. |
| 2005/0083907 | A1 | 4/2005 | Fishler |
| 2005/0091336 | A1 | 4/2005 | Dehamer et al. |
| 2005/0091572 | A1 | 4/2005 | Gavrilescu et al. |
| 2005/0108770 | A1 | 5/2005 | Karaoguz et al. |
| 2005/0125251 | A1 | 6/2005 | Berger et al. |
| 2005/0125739 | A1 | 6/2005 | Thompson et al. |
| 2005/0128961 | A1 | 6/2005 | Miloslavsky et al. |
| 2005/0135578 | A1 | 6/2005 | Ress et al. |
| 2005/0141500 | A1 | 6/2005 | Bhandari et al. |
| 2005/0147088 | A1 | 7/2005 | Bao et al. |
| 2005/0177635 | A1 | 8/2005 | Schmidt et al. |
| 2005/0181835 | A1 | 8/2005 | Lau et al. |
| 2005/0198292 | A1 | 9/2005 | Duursma et al. |
| 2005/0228680 | A1 | 10/2005 | Malik |
| 2005/0238153 | A1 | 10/2005 | Chevalier |
| 2005/0240659 | A1 | 10/2005 | Taylor |
| 2005/0240673 | A1* | 10/2005 | Yoneda ............... H04L 43/0811 709/229 |
| 2005/0243977 | A1 | 11/2005 | Creamer et al. |
| 2005/0246176 | A1 | 11/2005 | Creamer et al. |
| 2005/0286496 | A1 | 12/2005 | Malhotra et al. |
| 2005/0289222 | A1 | 12/2005 | Sahim |
| 2006/0008065 | A1 | 1/2006 | Longman et al. |
| 2006/0008073 | A1 | 1/2006 | Yoshizawa et al. |
| 2006/0008256 | A1 | 1/2006 | Khedouri et al. |
| 2006/0015467 | A1 | 1/2006 | Morken et al. |
| 2006/0021004 | A1 | 1/2006 | Moran et al. |
| 2006/0023676 | A1 | 2/2006 | Whitmore et al. |
| 2006/0047666 | A1 | 3/2006 | Bedi et al. |
| 2006/0067506 | A1 | 3/2006 | Flockhart et al. |
| 2006/0080415 | A1 | 4/2006 | Tu |
| 2006/0098624 | A1 | 5/2006 | Morgan et al. |
| 2006/0129638 | A1 | 6/2006 | Deakin |

(56) References Cited

U.S. PATENT DOCUMENTS

2006/0143007 A1 6/2006 Koh et al.
2006/0146792 A1 7/2006 Ramachandran et al.
2006/0146802 A1 7/2006 Baldwin et al.
2006/0168334 A1 7/2006 Potti et al.
2006/0203979 A1 9/2006 Jennings
2006/0209695 A1 9/2006 Archer, Jr. et al.
2006/0212865 A1 9/2006 Vincent et al.
2006/0215824 A1 9/2006 Mitby et al.
2006/0217823 A1 9/2006 Hussey
2006/0217978 A1 9/2006 Mitby et al.
2006/0222166 A1 10/2006 Ramakrishna et al.
2006/0235715 A1 10/2006 Abrams et al.
2006/0256816 A1 11/2006 Yarlagadda et al.
2006/0262915 A1 11/2006 Marascio et al.
2006/0270386 A1 11/2006 Yu et al.
2006/0285489 A1 12/2006 Francisco et al.
2007/0002744 A1 1/2007 Mewhinney et al.
2007/0036143 A1 2/2007 Alt et al.
2007/0038499 A1 2/2007 Margulies et al.
2007/0043681 A1 2/2007 Morgan et al.
2007/0050306 A1 3/2007 McQueen
2007/0064672 A1 3/2007 Raghav et al.
2007/0070906 A1 3/2007 Thakur
2007/0070980 A1 3/2007 Phelps et al.
2007/0071223 A1 3/2007 Lee et al.
2007/0074174 A1 3/2007 Thornton
2007/0088836 A1 4/2007 Tai et al.
2007/0091907 A1 4/2007 Seshadri et al.
2007/0107048 A1 5/2007 Halls et al.
2007/0112574 A1 5/2007 Greene
2007/0116191 A1 5/2007 Bermudez et al.
2007/0121651 A1 5/2007 Casey et al.
2007/0127691 A1 6/2007 Lert
2007/0127703 A1 6/2007 Siminoff
2007/0130167 A1 6/2007 Day et al.
2007/0130260 A1 6/2007 Weintraub et al.
2007/0133771 A1 6/2007 Stifelman et al.
2007/0147351 A1 6/2007 Dietrich et al.
2007/0149166 A1 6/2007 Turcotte et al.
2007/0153711 A1 7/2007 Dykas et al.
2007/0167170 A1 7/2007 Fitchett et al.
2007/0192629 A1 8/2007 Saito
2007/0201448 A1 8/2007 Baird et al.
2007/0208862 A1 9/2007 Fox et al.
2007/0232284 A1 10/2007 Mason et al.
2007/0239761 A1 10/2007 Baio et al.
2007/0242626 A1 10/2007 Altberg et al.
2007/0255828 A1 11/2007 Paradise
2007/0265073 A1 11/2007 Novi et al.
2007/0280216 A1 12/2007 Sabat et al.
2007/0286180 A1 12/2007 Marquette et al.
2007/0291734 A1 12/2007 Bhatia et al.
2007/0291905 A1 12/2007 Halliday et al.
2007/0293200 A1 12/2007 Roundtree et al.
2007/0295803 A1 12/2007 Levine et al.
2008/0005275 A1 1/2008 Overton et al.
2008/0025320 A1 1/2008 Bangalore et al.
2008/0037715 A1 2/2008 Prozeniuk et al.
2008/0037746 A1 2/2008 Dufrene et al.
2008/0040484 A1 2/2008 Yardley
2008/0049617 A1 2/2008 Grice et al.
2008/0052395 A1 2/2008 Wright et al.
2008/0091843 A1 4/2008 Kulkarni
2008/0101571 A1 5/2008 Harlow et al.
2008/0104348 A1 5/2008 Kabzinski et al.
2008/0120702 A1 5/2008 Hokimoto
2008/0123559 A1 5/2008 Haviv et al.
2008/0134049 A1 6/2008 Gupta et al.
2008/0139166 A1 6/2008 Agarwal et al.
2008/0146268 A1 6/2008 Gandhi et al.
2008/0152101 A1 6/2008 Griggs
2008/0154601 A1 6/2008 Stifelman et al.
2008/0155029 A1 6/2008 Helbling et al.
2008/0162482 A1 7/2008 Ahern et al.
2008/0165708 A1 7/2008 Moore et al.
2008/0172404 A1 7/2008 Cohen
2008/0177883 A1 7/2008 Hanai et al.
2008/0192736 A1 8/2008 Jabri et al.
2008/0201426 A1 8/2008 Darcie
2008/0209050 A1 8/2008 Li
2008/0212945 A1 9/2008 Khedouri et al.
2008/0222656 A1 9/2008 Lyman
2008/0229421 A1 9/2008 Hudis et al.
2008/0232574 A1 9/2008 Baluja et al.
2008/0235230 A1 9/2008 Maes
2008/0256224 A1 10/2008 Kaji et al.
2008/0275741 A1 11/2008 Loeffen
2008/0307436 A1 12/2008 Hamilton
2008/0310599 A1 12/2008 Purnadi et al.
2008/0313318 A1 12/2008 Vermeulen et al.
2008/0316931 A1 12/2008 Qiu et al.
2008/0317222 A1 12/2008 Griggs et al.
2008/0317232 A1 12/2008 Couse et al.
2008/0317233 A1 12/2008 Rey et al.
2009/0046838 A1 2/2009 Andreasson
2009/0052437 A1 2/2009 Taylor et al.
2009/0052641 A1 2/2009 Taylor et al.
2009/0059894 A1 3/2009 Jackson et al.
2009/0063502 A1 3/2009 Coimbatore et al.
2009/0074159 A1 3/2009 Goldfarb et al.
2009/0075684 A1 3/2009 Cheng et al.
2009/0083155 A1 3/2009 Tudor et al.
2009/0089165 A1 4/2009 Sweeney
2009/0089352 A1 4/2009 Davis et al.
2009/0089699 A1 4/2009 Saha et al.
2009/0092674 A1 4/2009 Ingram et al.
2009/0093250 A1 4/2009 Jackson et al.
2009/0094674 A1 4/2009 Schwartz et al.
2009/0125608 A1 5/2009 Werth et al.
2009/0129573 A1 5/2009 Gavan et al.
2009/0136011 A1 5/2009 Goel
2009/0170496 A1 7/2009 Bourque
2009/0171659 A1 7/2009 Pearce et al.
2009/0171669 A1 7/2009 Engelsma et al.
2009/0171752 A1 7/2009 Galvin et al.
2009/0182896 A1 7/2009 Patterson et al.
2009/0193433 A1 7/2009 Maes
2009/0216835 A1 8/2009 Jain et al.
2009/0217293 A1 8/2009 Wolber et al.
2009/0220057 A1 9/2009 Waters
2009/0221310 A1 9/2009 Chen et al.
2009/0222341 A1 9/2009 Belwadi et al.
2009/0225748 A1 9/2009 Taylor
2009/0225763 A1 9/2009 Forsberg et al.
2009/0228868 A1 9/2009 Drukman et al.
2009/0232289 A1 9/2009 Drucker et al.
2009/0234965 A1 9/2009 Viveganandhan et al.
2009/0235349 A1 9/2009 Lai et al.
2009/0241135 A1 9/2009 Wong et al.
2009/0252159 A1 10/2009 Lawson et al.
2009/0262725 A1 10/2009 Chen et al.
2009/0276771 A1 11/2009 Nickolov et al.
2009/0288012 A1 11/2009 Hertel et al.
2009/0288165 A1 11/2009 Qiu et al.
2009/0300194 A1 12/2009 Ogasawara
2009/0316687 A1 12/2009 Kruppa
2009/0318112 A1 12/2009 Vasten
2010/0027531 A1 2/2010 Kurashima
2010/0037204 A1 2/2010 Lin et al.
2010/0054142 A1 3/2010 Moiso et al.
2010/0070424 A1 3/2010 Monk
2010/0071053 A1 3/2010 Ansari et al.
2010/0082513 A1 4/2010 Liu
2010/0087215 A1 4/2010 Gu et al.
2010/0088187 A1 4/2010 Courtney et al.
2010/0088698 A1 4/2010 Krishnamurthy
2010/0094758 A1 4/2010 Chamberlain et al.
2010/0103845 A1 4/2010 Ulupinar et al.
2010/0107222 A1 4/2010 Glasser
2010/0115041 A1 5/2010 Hawkins et al.
2010/0138501 A1 6/2010 Clinton et al.
2010/0142516 A1 6/2010 Lawson et al.
2010/0150139 A1 6/2010 Lawson et al.
2010/0167689 A1 7/2010 Sepehri-Nik et al.

(56) References Cited

U.S. PATENT DOCUMENTS

| | | | |
|---|---|---|---|
| 2010/0188979 | A1 | 7/2010 | Thubert et al. |
| 2010/0191915 | A1 | 7/2010 | Spencer |
| 2010/0208881 | A1 | 8/2010 | Kawamura |
| 2010/0217837 | A1 | 8/2010 | Ansari et al. |
| 2010/0217982 | A1 | 8/2010 | Brown et al. |
| 2010/0232594 | A1 | 9/2010 | Lawson et al. |
| 2010/0235539 | A1 | 9/2010 | Carter et al. |
| 2010/0250946 | A1 | 9/2010 | Korte et al. |
| 2010/0251329 | A1 | 9/2010 | Wei |
| 2010/0251340 | A1 | 9/2010 | Martin et al. |
| 2010/0265825 | A1 | 10/2010 | Blair et al. |
| 2010/0281108 | A1 | 11/2010 | Cohen |
| 2010/0291910 | A1 | 11/2010 | Sanding et al. |
| 2010/0299437 | A1 | 11/2010 | Moore |
| 2010/0312919 | A1 | 12/2010 | Lee et al. |
| 2010/0332852 | A1 | 12/2010 | Vembu et al. |
| 2011/0026516 | A1 | 2/2011 | Roberts et al. |
| 2011/0029882 | A1 | 2/2011 | Jaisinghani |
| 2011/0029981 | A1 | 2/2011 | Jaisinghani |
| 2011/0053555 | A1 | 3/2011 | Cai et al. |
| 2011/0078278 | A1 | 3/2011 | Cui et al. |
| 2011/0081008 | A1 | 4/2011 | Lawson et al. |
| 2011/0083069 | A1 | 4/2011 | Paul et al. |
| 2011/0083179 | A1 | 4/2011 | Lawson et al. |
| 2011/0093516 | A1 | 4/2011 | Geng et al. |
| 2011/0096673 | A1 | 4/2011 | Stevenson et al. |
| 2011/0110366 | A1 | 5/2011 | Moore et al. |
| 2011/0128572 | A1* | 6/2011 | Hosotsubo ............ G06F 3/1257 358/1.15 |
| 2011/0131293 | A1 | 6/2011 | Mori |
| 2011/0138453 | A1 | 6/2011 | Verma et al. |
| 2011/0143714 | A1 | 6/2011 | Keast et al. |
| 2011/0145049 | A1 | 6/2011 | Hertel et al. |
| 2011/0149810 | A1 | 6/2011 | Koren et al. |
| 2011/0149950 | A1 | 6/2011 | Petit-Huguenin et al. |
| 2011/0151884 | A1 | 6/2011 | Zhao |
| 2011/0158235 | A1 | 6/2011 | Senga |
| 2011/0167172 | A1 | 7/2011 | Roach et al. |
| 2011/0170505 | A1 | 7/2011 | Rajasekar et al. |
| 2011/0176537 | A1 | 7/2011 | Lawson et al. |
| 2011/0179126 | A1 | 7/2011 | Wetherell et al. |
| 2011/0211679 | A1 | 9/2011 | Mezhibovsky et al. |
| 2011/0225447 | A1 | 9/2011 | Bostick et al. |
| 2011/0251921 | A1 | 10/2011 | Kassaei et al. |
| 2011/0253693 | A1 | 10/2011 | Lyons et al. |
| 2011/0255675 | A1 | 10/2011 | Jasper et al. |
| 2011/0258432 | A1 | 10/2011 | Rao et al. |
| 2011/0265168 | A1 | 10/2011 | Lucovsky et al. |
| 2011/0265172 | A1 | 10/2011 | Sharma |
| 2011/0267985 | A1 | 11/2011 | Wilkinson et al. |
| 2011/0274111 | A1 | 11/2011 | Narasappa et al. |
| 2011/0276892 | A1 | 11/2011 | Jensen-Horne et al. |
| 2011/0276951 | A1 | 11/2011 | Jain |
| 2011/0280390 | A1 | 11/2011 | Lawson et al. |
| 2011/0283259 | A1 | 11/2011 | Lawson et al. |
| 2011/0289126 | A1 | 11/2011 | Aikas et al. |
| 2011/0289162 | A1 | 11/2011 | Furlong et al. |
| 2011/0299672 | A1 | 12/2011 | Chiu et al. |
| 2011/0310902 | A1 | 12/2011 | Xu |
| 2011/0313950 | A1 | 12/2011 | Nuggehalli et al. |
| 2011/0320449 | A1 | 12/2011 | Gudlavenkatasiva |
| 2011/0320550 | A1 | 12/2011 | Lawson et al. |
| 2012/0000903 | A1 | 1/2012 | Baarman et al. |
| 2012/0011274 | A1 | 1/2012 | Moreman |
| 2012/0017222 | A1 | 1/2012 | May |
| 2012/0023531 | A1 | 1/2012 | Meuninck et al. |
| 2012/0023544 | A1 | 1/2012 | Li et al. |
| 2012/0027228 | A1 | 2/2012 | Rijken et al. |
| 2012/0028602 | A1 | 2/2012 | Lisi et al. |
| 2012/0036574 | A1 | 2/2012 | Heithcock et al. |
| 2012/0039202 | A1 | 2/2012 | Song |
| 2012/0059709 | A1 | 3/2012 | Lieberman et al. |
| 2012/0079066 | A1 | 3/2012 | Li et al. |
| 2012/0083266 | A1 | 4/2012 | Vanswol et al. |
| 2012/0089572 | A1 | 4/2012 | Raichstein et al. |
| 2012/0094637 | A1 | 4/2012 | Jeyaseelan et al. |
| 2012/0101952 | A1 | 4/2012 | Raleigh et al. |
| 2012/0110564 | A1 | 5/2012 | Ran et al. |
| 2012/0114112 | A1 | 5/2012 | Rauschenberger et al. |
| 2012/0149404 | A1 | 6/2012 | Beattie et al. |
| 2012/0166488 | A1 | 6/2012 | Kaushik et al. |
| 2012/0170726 | A1 | 7/2012 | Schwartz |
| 2012/0173610 | A1 | 7/2012 | Bleau et al. |
| 2012/0174095 | A1 | 7/2012 | Natchadalingam et al. |
| 2012/0179646 | A1 | 7/2012 | Hinton et al. |
| 2012/0179907 | A1 | 7/2012 | Byrd et al. |
| 2012/0180021 | A1 | 7/2012 | Byrd et al. |
| 2012/0180029 | A1 | 7/2012 | Hill et al. |
| 2012/0185561 | A1 | 7/2012 | Klein et al. |
| 2012/0198004 | A1 | 8/2012 | Watte |
| 2012/0201238 | A1 | 8/2012 | Lawson et al. |
| 2012/0208495 | A1 | 8/2012 | Lawson et al. |
| 2012/0221603 | A1 | 8/2012 | Kothule et al. |
| 2012/0226579 | A1 | 9/2012 | Ha et al. |
| 2012/0239757 | A1 | 9/2012 | Firstenberg et al. |
| 2012/0240226 | A1 | 9/2012 | Li |
| 2012/0246273 | A1 | 9/2012 | Bornstein et al. |
| 2012/0254828 | A1 | 10/2012 | Aiylam et al. |
| 2012/0266258 | A1 | 10/2012 | Tuchman et al. |
| 2012/0281536 | A1 | 11/2012 | Gell et al. |
| 2012/0288082 | A1 | 11/2012 | Segall |
| 2012/0290706 | A1 | 11/2012 | Lin et al. |
| 2012/0304245 | A1 | 11/2012 | Lawson et al. |
| 2012/0304275 | A1 | 11/2012 | Ji et al. |
| 2012/0316809 | A1 | 12/2012 | Egolf et al. |
| 2012/0321058 | A1 | 12/2012 | Eng et al. |
| 2012/0321070 | A1 | 12/2012 | Smith et al. |
| 2013/0029629 | A1 | 1/2013 | Lindholm et al. |
| 2013/0031158 | A1 | 1/2013 | Salsburg |
| 2013/0031613 | A1 | 1/2013 | Shanabrook et al. |
| 2013/0036476 | A1 | 2/2013 | Roever et al. |
| 2013/0047232 | A1 | 2/2013 | Tuchman et al. |
| 2013/0054517 | A1 | 2/2013 | Beechuk et al. |
| 2013/0054684 | A1 | 2/2013 | Brazier et al. |
| 2013/0058262 | A1 | 3/2013 | Parreira |
| 2013/0067232 | A1 | 3/2013 | Cheung et al. |
| 2013/0067448 | A1 | 3/2013 | Sannidhanam et al. |
| 2013/0097298 | A1 | 4/2013 | Ting et al. |
| 2013/0110658 | A1 | 5/2013 | Lyman |
| 2013/0132573 | A1 | 5/2013 | Lindblom |
| 2013/0139148 | A1 | 5/2013 | Berg et al. |
| 2013/0156024 | A1 | 6/2013 | Burg |
| 2013/0166580 | A1 | 6/2013 | Maharajh et al. |
| 2013/0179942 | A1 | 7/2013 | Caplis et al. |
| 2013/0201909 | A1 | 8/2013 | Bosch et al. |
| 2013/0204786 | A1 | 8/2013 | Mattes et al. |
| 2013/0212603 | A1 | 8/2013 | Cooke et al. |
| 2013/0244632 | A1 | 9/2013 | Spence et al. |
| 2013/0268676 | A1 | 10/2013 | Martins et al. |
| 2013/0325934 | A1 | 12/2013 | Fausak et al. |
| 2013/0328997 | A1 | 12/2013 | Desai |
| 2013/0336472 | A1 | 12/2013 | Fahlgren et al. |
| 2014/0013400 | A1 | 1/2014 | Warshavsky et al. |
| 2014/0025503 | A1 | 1/2014 | Meyer et al. |
| 2014/0058806 | A1 | 2/2014 | Guenette et al. |
| 2014/0064467 | A1 | 3/2014 | Lawson et al. |
| 2014/0072115 | A1 | 3/2014 | Makagon et al. |
| 2014/0073291 | A1 | 3/2014 | Hildner et al. |
| 2014/0095627 | A1 | 4/2014 | Romagnino |
| 2014/0101058 | A1 | 4/2014 | Castel et al. |
| 2014/0101149 | A1 | 4/2014 | Winters et al. |
| 2014/0105372 | A1 | 4/2014 | Nowack et al. |
| 2014/0106704 | A1 | 4/2014 | Cooke et al. |
| 2014/0122600 | A1 | 5/2014 | Kim et al. |
| 2014/0123187 | A1 | 5/2014 | Reisman |
| 2014/0126715 | A1 | 5/2014 | Lum et al. |
| 2014/0129363 | A1 | 5/2014 | Lorah et al. |
| 2014/0153565 | A1 | 6/2014 | Lawson et al. |
| 2014/0185490 | A1 | 7/2014 | Holm et al. |
| 2014/0254600 | A1 | 9/2014 | Shibata et al. |
| 2014/0258481 | A1 | 9/2014 | Lundell |
| 2014/0269333 | A1 | 9/2014 | Boerjesson |
| 2014/0274086 | A1 | 9/2014 | Boerjesson et al. |
| 2014/0282473 | A1 | 9/2014 | Saraf et al. |

(56) References Cited

U.S. PATENT DOCUMENTS

| | | | |
|---|---|---|---|
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, III et al. |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2016/0359926 A1 | 12/2016 | Lawson et al. |
| 2017/0339283 A1 | 11/2017 | Chaudhary et al. |
| 2018/0109569 A1 | 4/2018 | Lawson et al. |
| 2019/0289041 A1 | 9/2019 | Lawson et al. |

FOREIGN PATENT DOCUMENTS

| | | | |
|---|---|---|---|
| EP | 1464418 | A1 | 10/2004 |
| EP | 1522922 | A2 | 4/2005 |
| EP | 1770586 | A1 | 4/2007 |
| EP | 2053869 | A1 | 4/2009 |
| ES | 2134107 | A1 | 9/1999 |
| JP | 10294788 | A | 11/1998 |
| JP | 2004166000 | A | 6/2004 |
| JP | 2004220118 | A | 8/2004 |
| JP | 2006319914 | A | 11/2006 |
| WO | WO-9732448 | A1 | 9/1997 |
| WO | WO-2002087804 | A1 | 11/2002 |
| WO | WO-2006037492 | A1 | 4/2006 |
| WO | WO-2009018489 | A2 | 2/2009 |
| WO | WO-2009124223 | A1 | 10/2009 |
| WO | WO-2010037064 | A1 | 4/2010 |
| WO | WO-2010040010 | A1 | 4/2010 |
| WO | WO-2010101935 | A1 | 9/2010 |
| WO | WO-2011091085 | A1 | 7/2011 |

OTHER PUBLICATIONS

U.S. Appl. No. 14/176,426 U.S. Pat. No. 9,455,949, filed Feb. 10, 2014, Method for Processing Telephony Sessions of a Network.

U.S. Appl. No. 15/241,504 U.S. Pat. No. 9,882,942, filed Aug. 19, 2016, Method for Processing Telephony Sessions of a Network.

U.S. Appl. No. 15/841,781 U.S. Pat. No. 10,230,772, filed Dec. 14, 2017, Method for Processing Telephony Sessions of a Network.

U.S. Appl. No. 16/279,280, filed Feb. 19, 2019, Method for Processing Telephony Sessions of a Network.

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.

"U.S. Appl. No. 13/021,645, Non Final Office Action dated May 22, 2013", 17 pgs.

"U.S. Appl. No. 13/021,645, Notice of Allowance dated Oct. 15, 2013", 12 pgs.

"U.S. Appl. No. 13/021,645, Preliminary Amendment filed Feb. 23, 2011", 5 pgs.

"U.S. Appl. No. 13/021,645, Preliminary Amendment filed Mar. 28, 2011", 6 pgs.

"U.S. Appl. No. 13/021,645, Response filed Aug. 12, 2013 to Non Final Office Action dated May 22, 2013", 12 pgs.

"U.S. Appl. No. 14/176,426, Corrected Notice of Allowance dated Jun. 3, 2016", 2 pgs.

"U.S. Appl. No. 14/176,426, Non Final Office Action Feb. 24, 2016", 9 pgs.

"U.S. Appl. No. 14/176,426, Notice of Allowance dated May 20, 2016", 9 pgs.

"U.S. Appl. No. 14/176,426, Preliminary Amendment filed May 6, 2014", 7 pgs.

"U.S. Appl. No. 14/176,426, Response filed Mar. 28, 2016 to Non Final Office Action dated Feb. 24, 2014", 7 pgs.

"U.S. Appl. No. 15/241,504, Non Final Office Action dated Jul. 3, 2017", 25 pgs.

"U.S. Appl. No. 15/241,504, Notice of Allowance dated Sep. 14, 2017", 11 pgs.

"U.S. Appl. No. 15/241,504, Notice of Allowance dated Dec. 29, 2017", 2 pgs.

"U.S. Appl. No. 15/241,504, Response filed Jul. 28, 2017 to Non Final Office Action dated Jul. 3, 2017", 10 pgs.

"U.S. Appl. No. 15/841,781, Examiner Interview Summary dated Jun. 14, 2018", 3 pgs.

"U.S. Appl. No. 15/841,781, Final Office Action dated Jul. 26, 2018", 14 pgs.

"U.S. Appl. No. 15/841,781, Notice of Allowance dated Oct. 30, 2018", 10 pgs.

"U.S. Appl. No. 15/841,781, Response filed Jun. 7, 2018 to Non Final Office Action dated Mar. 14, 2018", 12 pgs.

"U.S. Appl. No. 15/841,781, Response filed Sep. 24, 2018 to Final Office Action dated Jul. 26, 2018", 9 pgs.

"U.S. Appl. No. 16/279,280, Final Office Action dated Jan. 24, 2020", 11 pgs.

"U.S. Appl. No. 16/279,280, Non Final Office Action dated Oct. 3, 2019", 26 pgs.

"U.S. Appl. No. 16/279,280, Notice of Allowance dated Mar. 23, 2020", 11 pgs.

"U.S. Appl. No. 16/279,280, Preliminary Amendment filed Jun. 10, 2019", 6 pgs.

"U.S. Appl. No. 16/279,280, Response filed Jan. 3, 2020 to Non Final Office Action dated Oct. 3, 2019", 12 pgs.

"U.S. Appl. No. 16/279,280, Response filed Mar. 4, 2020 to Final Office Action dated Jan. 24, 2020", 8 pgs.

"Archive Microsoft Office 365 Email | Retain Unified Archiving", GWAVA, Inc., Montreal, Canada, [Online] Retrieved from the Internet: <URL: http://www.gwava.com/Retain/Retain_for_Office_365.php>, (2015), 4 pgs.

"Complaint for Patent Infringement", *Telinit Technologies, LLC* v. *Twilio Inc* 2:12-cv-663, (Oct. 12, 2012), 17 pgs.

"Ethernet to Token Ring Bridge", Black Box Corporation, [Online] Retrieved from the Internet: <URL: http://blackboxcanada.com/resource/files/productdetails/17044.pdf>, (Oct. 1999), 2 pgs.

"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF}, (Nov. 21-23, 2012), 1-6.

(56) References Cited

OTHER PUBLICATIONS

Barakovic, Sabina, et al., "Survey and Challenges of QoE Management Issues in Wireless Networks", Hindawi Publishing Corporation, (2012), 1-29.
Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.
Kim, Hwa-Jong, et al., "In-Service Feedback QoE Framework", 2010 Third International Conference on Communication Theory. Reliability and Quality of Service, (2010), 135-138.
Matos, et al., "Quality of Experience-based Routing in Multi-Service Wireless Mesh Petworks", Realizing Advanced Video Optimized Wireless Networks. IEEE, (2012), 7060-7065.
Mu, Mu, et al., "Quality Evaluation in Peer-to-Peer IPTV Services", Data Traffic and Monitoring Analysis, LNCS 7754, 302-319, (2013), 18 pgs.
Murai, "Web Server for Managing Session and Its Method", EP 2116937 A1 European Patent Application, (Jan. 17, 2008).
Subramanya, et al., "Digital Signatures", IEEE Potentials, (Mar./Apr. 2006), 5-8.
Tran, et al., "User to User adaptive routing based on QoE", ICNS 2011: The Seventh International Conference on Networking and Services, (2011), 170-177.
"U.S. Appl. No. 16/279,280, Corrected Notice of Allowability dated May 14, 2020", 2 pgs.

* cited by examiner

```
GET /foo.php  HTTP/1.1
Host:  demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length:  0
```

FIGURE 4A

```
POST /foo.php  HTTP/1.1
Host:  demo.twilio.com
Content-Type:  application/x-www-form-urlencoded
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length:  11

Digits=1234
```

FIGURE 4B

```
GET /foo.php?digits=1234  HTTP/1.1
Host:  demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length:  0
```

FIGURE 4C

```
GET /foo.php  HTTP/1.1
Host:  demo.twilio.com
X-Twilio-SMSid=DE870AD708ED70AE87D0AE7DAD7
X-Twilio-SMSSenderID=415-555-1212
X-Twilio-SMSShortCode=11111
X-Twilio-AccountId=AAF4AF5AF8A9A885449F7A647AF84
Content-Length:  0
```

FIGURE 4D

```
GET /foo.php  HTTP/1.1
Host:  demo.twilio.com
X-Twilio-SMSid=DE870AD708ED70AE87D0AE7DAD7
X-Twilio-SMSSenderId=415-555-1212
X-Twilio-SMSShortCode=11111
X-Twilio-AccountId=AAF4AF5AF8A9A885449F7A647AF84
Content-Length:  21

Message=statusrequest
```

FIGURE 4E

```
GET /foo.php?message=statusrequest  HTTP/1.1
Host:  demo.twilio.com
X-Twilio-SMSid=DE870AD708ED70AE87D0AE7DAD7
X-Twilio-SMSSenderId=415-555-1212
X-Twilio-SMSShortCode=11111
X-Twilio-AccountId=AAF4AF5AF8A9A885449F7A647AF84
Content-Length:  0
```

FIGURE 4F

XML Response

```
<?xml version="1.0" encoding="UTF-8"?>
<Response>
        <Collect
                successUrl="http://www.example.com/phonetree.php"
                numDigits="1"
                timeout=20
        >
                <Say voice="female">
For sales press one. For support press two. For the operator, press three.
                </Say>
        </Collect>
</Response>
```

FIGURE 5A

XML Response

```
<?xml version="1.0" encoding="UTF-8"?>
<Response>
        <sms address=415-555-555
                thanks for the your text, will call at 5 PM.
        </sms>
        <CallAtTime="17:00PST">
                Today
                <Dial>415-555-5309</Dial>

        </CallAtTime>
</Response>
```

FIGURE 5B

METHOD FOR PROCESSING TELEPHONY SESSIONS OF A NETWORK

CROSS REFERENCE TO RELATED APPLICATIONS

This application is a continuation of U.S. patent application Ser. No. 16/279,280, filed 19 Feb. 2019, which is a continuation of U.S. patent application Ser. No. 15/841,781, filed 14 Dec. 2017, which is a continuation of U.S. patent application Ser. No. 15/241,504, filed 19 Aug. 2016, now issued as U.S. Pat. No. 9,882,942, which is a continuation of U.S. patent application Ser. No. 14/176,426, filed 10 Feb. 2014, now issued as U.S. Pat. No. 9,455,949, which is a continuation of U.S. patent application Ser. No. 13/021,645, filed 4 Feb. 2011, now issued as U.S. Pat. No. 8,649,268, the entirety of all of which are incorporated by reference herein.

TECHNICAL FIELD

This invention relates generally to the telephony field, and more specifically to a new and useful method for processing telephony sessions in the telephony field.

BACKGROUND

In recent years, telephony applications have become more integrated with web applications. Telephony platforms have enabled web developers to apply their skill sets in the field of telephony. New products and services have been offered leveraging this new technical capability. However, integrating web applications with telephony services have introduced new problems to the field of telephony. In telephony applications, users have higher expectations and application errors are not expected or tolerated. In a telephone call there is less opportunities to signal to a user of an error. Companies providing telephony applications can lose customers during an application error. Additionally, applications are unable to be integrated with a telephone session. This places an increase burden on developers and limits the capabilities of telephony applications. Thus, there is a need in the telephony field to create a new and useful method for processing telephony sessions. This invention provides such a new and useful method.

BRIEF DESCRIPTION OF THE FIGURES

FIGS. 4A-4C are examples of a HTTP GET request, a HTTP POST request, and a HTTP GET request, respectively;

FIGS. 4D-4F are examples of a HTTP requests; and

FIGS. 5A and 5B are examples of XML responses.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
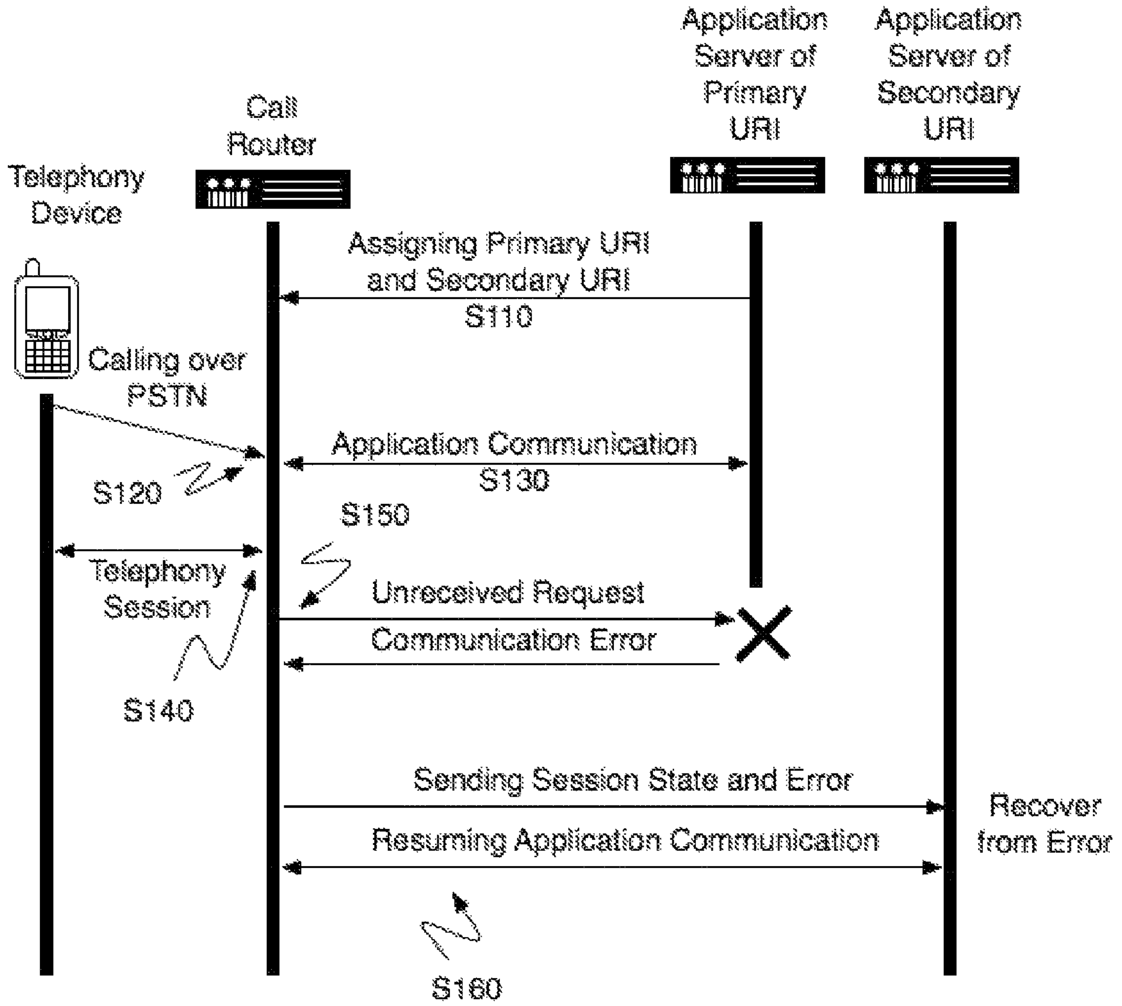
FIG. 1 is a schematic representation of a method of a preferred embodiment of the invention.
Figure 2:
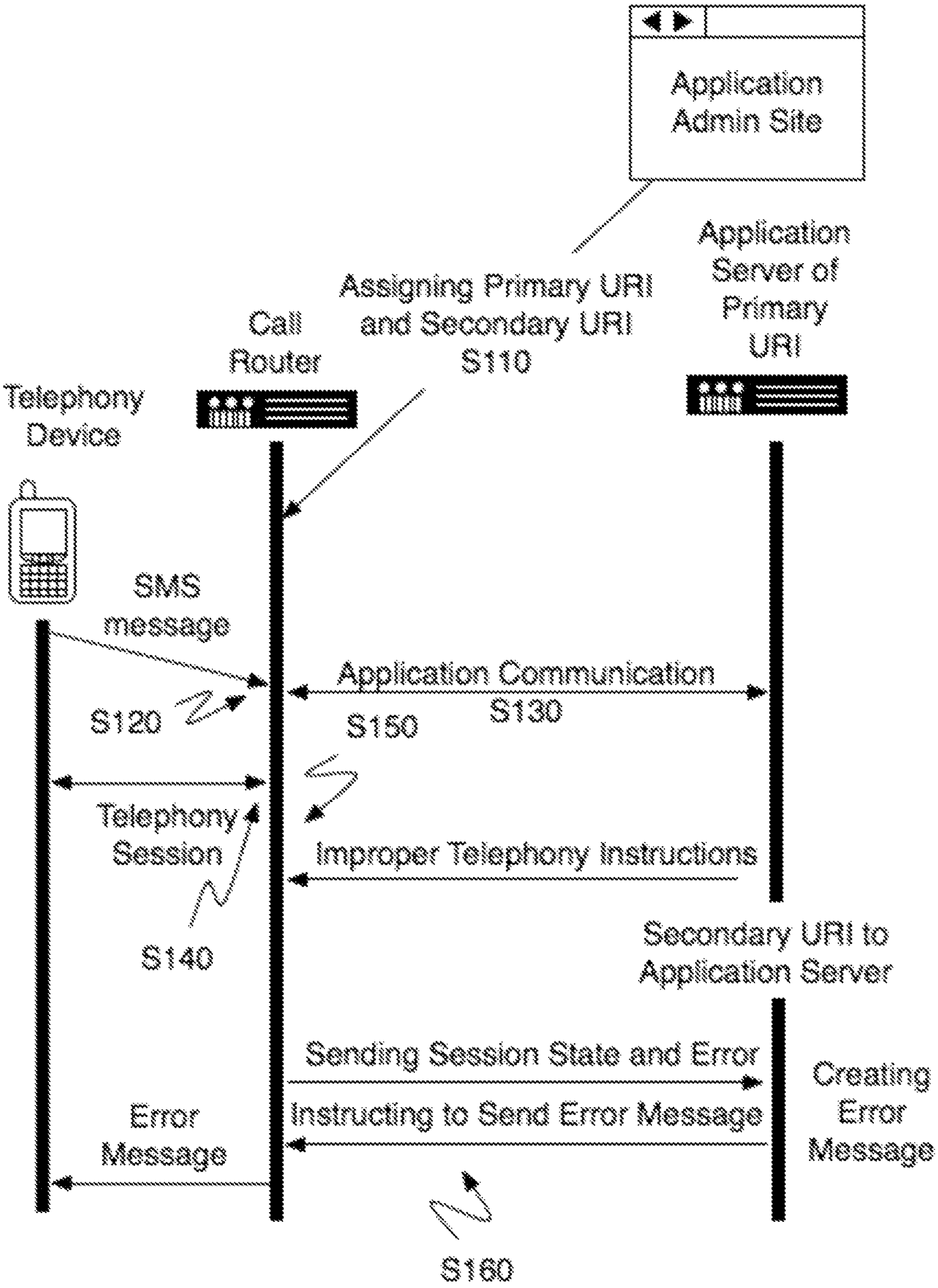
FIG. 2 is a schematic representation of a method of a preferred embodiment of the invention with a fallback URI.

As shown in FIG. 1, a method for processing telephony sessions of a preferred embodiment includes assigning a primary Uniform Resource Identifier (URI) and at least one secondary URI to an application S110; mapping a telephony session to the primary URI S120; communicating with the application server designated by the primary URI using an application layer protocol S130; receiving telephony instructions from the application server and processing the telephony instructions with the call router S140; detecting an application event S150; and upon detecting the application event, communicating with the application server designated by the secondary URI S160. The method functions to redirect program flow to secondary or backup applications. In one embodiment the method functions to handle and possibly recover from errors that occur during a session of a telephony application, as shown in FIGS. 2A and 2B. For example, when an application error occurs, the secondary URI may be used as a fallback URI to take control of call control. In a second embodiment, the method functions to enable additional services to be updated during a call. For example, an outside service may store and process phone call recordings, and anytime a recording occurs on a telephony platform, the recording is sent to the outside service located at the secondary URI (i.e., a status callback URI). The method is preferably implemented within a telephony platform such as the one described in U.S. patent application Ser. No. 12/417,630, filed 2 Apr. 2009 and entitled "SYSTEM AND METHOD FOR PROCESSING TELEPHONY SESSIONS", which is hereby incorporated in its entirety by this reference. The method may, however, alternatively be implemented on any suitable system. The method is preferably used in systems that operate on a distributed system. For example, the telephony platform is preferably separate from the application server(s) hosting a specific application. An application event may be an application error, a state change during a telephony session, a particular telephony instruction or user action, or any suitable event. An application error could occur in communication between the telephony platform and the application server(s). Alternatively, application error may be customer error such as when the application server sends improperly formed or illegal instructions to the telephony platform. State change of a telephony session may alternatively be an application event that triggers communication with a status callback URI. The secondary URI may be to a server operated by the same entity as the application server or it may be an outside third-party service or any suitable server application. A status callback URI preferably does not alter the state of the telephony session but can be used as a supplementary tool for providing data to other services during a session. The method may be used for voice-based, short message service (SMS)-based, multimedia messaging service (MMS)-based, fax-based, or any suitable telephony network based communication.

Figure 3:
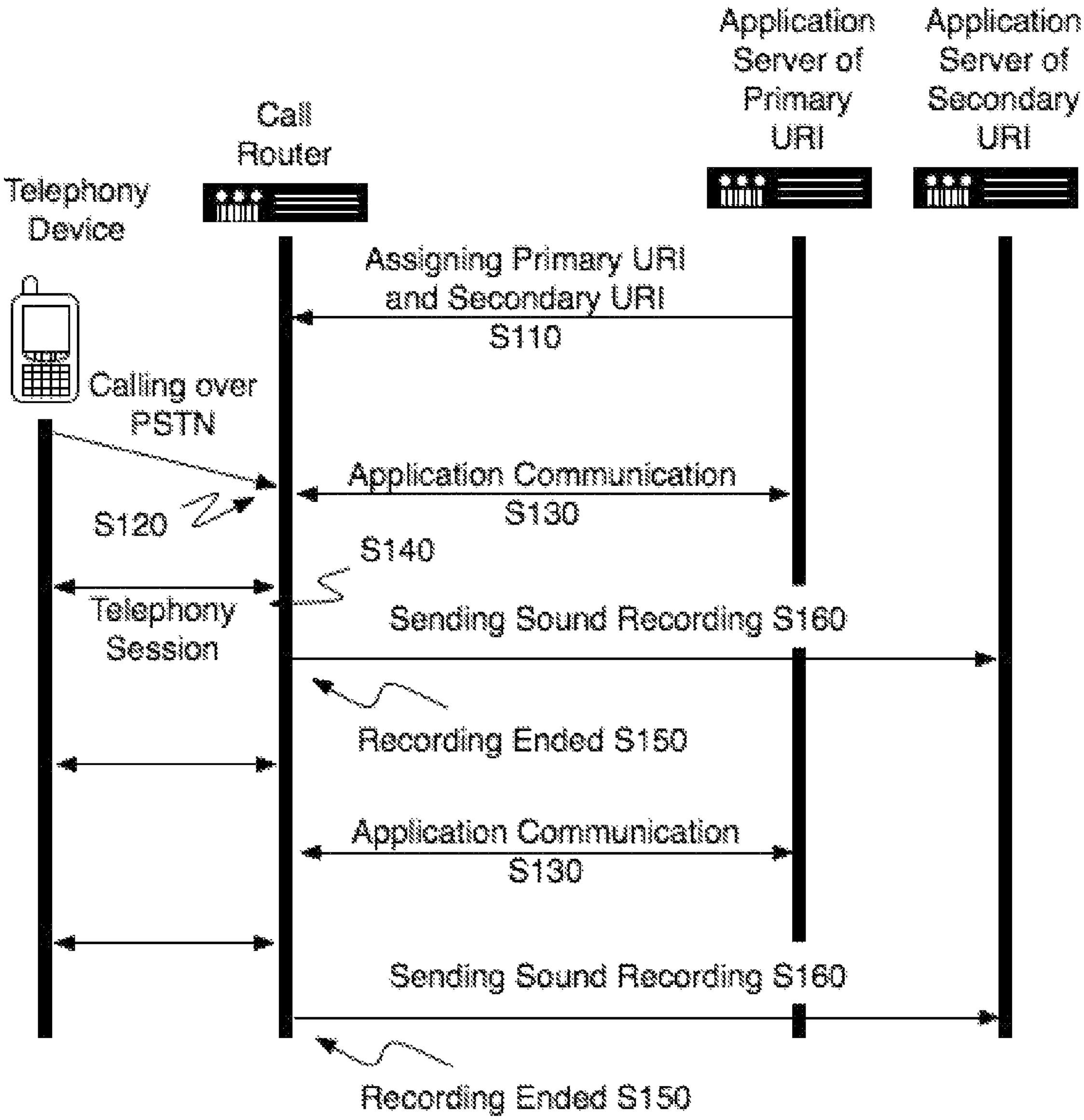
FIG. 3 is a schematic representation of a method of a preferred embodiment of the invention with a status callback URI.

Step S110, which includes assigning a primary Uniform Resource Identifier (URI) and at least a secondary URI to an application, functions to specify a URI for handling typical telephony application handling and a URI for handling a telephony application during a communication failure. The primary and secondary URIs are preferably universal resource locators (URL) that point to an application server or servers of the application operator. The primary URI and secondary URI may alternatively be any suitable address to resources of the telephony application. The URIs may be set within a settings interface for an application administrator. The URIs may alternatively be resources on a telephony platform for a particular telephony application. These resources are preferably accessible through an application programming interface (API) such as the API described in U.S. patent application Ser. No. 12/417,630. The primary URI preferably includes a default value of an initial URI. The initial URI is used for a new telephony session. This initial URI is preferably associated with an assigned telephony address (e.g., a phone number, SMS long code, SMS short code, etc.) that is used in determining what application server to manage a call. For example, when an incoming call is made to a phone number of an application, the initial URI associated with the phone number is used as the primary URI for the first communication message sent to the application server. The primary URI is preferably updated during a telephony session during the communication with the application. For example, a telephony command may be sent to the telephony platform instructing the telephony platform to gather the pressed digits during a phone call and to return the results to a new URI. The primary URI will preferably change to the new URI after the results are gathered. At the end of a telephony session the primary URI is preferably reset to the default initial URI. The primary URI may alternatively remain unchanged from the initial URI. The secondary URI as described may be an address to any suitable service. In one variation, the secondary URI is a fallback URI that preferably addresses error handling code/logic. The fallback URI is preferably hosted on a different application server in case the application server of the primary URI fails. In a second variation, the secondary URI is a status callback URI that preferably addresses a service that acts as a supplementary destination for telephony session data as shown in FIG. 3. Status callback URIs may be used for sending transcripts, recordings, telephony session call flow, numbers dialed, and/or any suitable aspect of a telephony session. A status callback URI is preferably registered for particular type of state change in a telephony session such as the ending of a recording, but may alternatively be for a plurality of types of events such as the start and end of any recording, transcription, and button input. These may be registered for all instances of an application or be registered during a particular telephony session of an application. They may be registered through telephony instructions, through an API, and/or through any suitable method. There may be a plurality of secondary URIs. One variation may allow specific errors or failures to be associated with specific fallback URIs. Another variation preferably uses multiple fallback URIs as redundant backups. For example, if after a primary URI fails a fallback URI is used, and if the fallback URI fails then the next fallback URI is used. Additionally, multiple status callback URIs may be used. A variety of third-party services may be used, each with a status callback URI for different events of a telephony application. Status Callback URIs, and fallback URIs may additionally be used in the same application, such that each application would be capable of providing status callbacks to various services and providing error handling code.

Step S120, which includes mapping a telephony session to the primary URI, functions to enable a telephony session to be converted into a format that may be handled with standard web servers and web applications. The mapping is preferably performed using a call router. An initial URI (e.g., default primary URI) is preferably pre-specified at the call router by a web application (which may be running on a third party server) or call router account owner. More preferably, the initial URI is assigned to the call via a unique identifier for the call destination, such as a DID (Direct Inbound Dial) phone number, or a VOIP SIP address. The URI may alternatively be specified by a remote server or other suitable device or method. In one variation, the URI may be used to encapsulate state information or a portion of state information from the initiated telephony session, such as the originating phone number, the dialed phone number, the date and time of the call, geographic location of the caller (e.g. country, city, state, and/or zip), and/or the unique call ID. The information included in the URI may be included in the form of a URI template. For example the URI default template could be: http://demo.twilio.com/myapp/{dialed phone number}/{originating phone number} or http://demo.twilio.com/myapp/foo.php?dialed_number={dialed phone number}& originating_number={originating phone number}.

Step S130, which includes communicating with the application server designated by the primary URI using an application layer protocol, functions to send and receive messages between the call router/telephony platform and the application server. The application control of a telephony session preferably occurs through the communication with the application server. The communication preferably includes the sending of requests to the application server; after the application server processes the request, receiving a response; and processing the response.

Preferably, a telephony session request is sent to the primary URI. During the initial request sent to the application, the default initial URI is preferably used. The request is preferably sent to a server over a network. In one variation, the request is sent to a local server on a local area network. In another variation, the request is sent to a server running locally on the device originating the call. In yet another variation, the request may be sent to multiple servers. The request preferably encapsulates at least a portion of the state information from the initiated telephony session, such as the originating phone number, the dialed phone number, the date and time of the call, geographic location of the caller (e.g. country, city, and/or state, zip), and/or the unique call ID. The request, more preferably, encapsulates all the state information of the call, but may alternatively include no state information or partial state information. The state information from the initiated telephony session is preferably sent via HTTP POST in the request body, HTTP GET in the request URI, HTTP header parameters to mimic the data flow of a web browser, or by any combination or suitable alternative way. If new state information is generated in the course of the operation of the call router, a request to the application server is preferably made to communicate the new state and to request new telephony instructions. Preferably, new state information is not kept or acted upon internally by the call router, but is passed to the application server for processing. Alternatively, partial state information is preferably stored on the call router until a fully updated state is achieved, and then communicated to the application server. For example, the application server may specify that multiple digits should be pressed on the keypad, not just one, before new call state is derived and communicated to the application server. In one variation, the information from the initiated telephone session may be a web-form submission included in the HTTP POST request. The request may include any state information from the telephony session, such as the originating phone number, the dialed phone number, the date and time of the call, and/or the unique call ID, the current status of the phone call (pending, in-progress, completed, etc.), or the results of a telephony action, including Dual Tone Multi Frequency (DTMF) digit processing, or a representation of or a link to a sound recording, or the status of the last command, or other call state. Examples of a HTTP GET request, a HTTP POST request, and a HTTP GET request are shown in FIGS. 4A, 4B, and 4C, respectively. Further examples of HTTP communication used for SMS messaging are shown in FIGS. 4D, 4E, and 4F. The HTTP request (or any suitable request communication) to the server preferably observes the principles of a RESTful design. RESTful is understood in this document to describe a Representational State Transfer architecture as is known in the art. The RESTful HTTP requests are preferably stateless, thus each message communicated from the call router to the application server preferably contains all necessary information for operation of the application server and response generation of the application server. The call router and/or the application server preferably do not need to remember or store previous communications to be aware of the state. Documents, media, and application state are preferably viewed as addressable resources, combined with data provide to the resource via request parameter, such as HTTP GET or HTTP POST parameters, or request body contents. Such request data may include an updated representation of the call resource, or other call state data generated as a result of call router operation, such as digits pressed on the keypad or audio recordings generated. State information included with each request may include a unique call identifier, call status data such as whether the call is in-progress or completed, the caller ID of the caller, the phone number called, geographic data about the callers, and/or any suitable data. However, a varying level of a RESTful communication (statelessness) may be used, such as by using cookies, session tracking, or any suitable devices to simulate a normal website visitor model. Preferably, data sent with each request may fully enable the application server to determine the next state of the call to execute. RESTfulness preferably does not preclude using external datasource, such as a database, to lookup additional data to log call meta data, or determine application logic.

The application server will preferably process the request and send a response to the call router. Thus Step S130 would include receiving a response from the application server. This response is preferably an HTTP response. The response is preferably sent as XML, audio binary, or raw text, but may alternatively be any sort of messaging format, including HTML, delimited text, key/value text or binary encoded format. The HTTP response preferably includes directions to perform telephony actions. The response may alternatively or additionally include a new URI or a new URI template to use as the primary URI with the telephony action in Step S140. An additional example XML response is shown in FIGS. 5A and 5B.

Step S140, which includes receiving telephony instructions from the application server and processing the telephony instructions with the call router, functions to convert the server response into telephony actions or executable operations during a telephony session. The telephony actions may include, for example, playing a pre-recorded sound file at a server-specified URI (such as a static mp3 file located at http://demo.twilio.com/myapp/1234.mp3), reading text to the caller using text-to-speech technology, calling another number (such as creating a new voice connection through the PSTN, SIP/VoIP, or other IP technology system), collecting digits via DTMF input, recording voice response audio, TTY or other inputs, sending an SMS message, or any suitable combination or sequence of these or other suitable actions. This conversion of the server response is preferably performed at a call router. Preferably, Step S120 includes processing the response mime-types associated with the server response. For example, if the response mime-type is XML, it is considered to be a set of call router instructions. If the response mime-type is MP3, it is considered a sound file to be played for the caller. If the response type is plain text, it is considered to be text to be read, via Text-To-Speech, to the caller.

Contents of the server response, such as an XML document, are preferably converted into a telephony action by processing the document sequentially (e.g. line by line). Telephony instructions are preferably contained within the document in the form of a markup language, such as XML as shown in FIGS. 5A and 5B. This sequential approach to processing a document of telephony instructions is enabled when the communication is stateless and all the necessary information is contained within the URI. This stateless communication preferably allows telephony instructions (verbs or commands) to be used as the programming interface for a server application performing telephony services. Algorithmic interpretation (based on the state of the communication) of the telephony verbs or the document is preferably not necessary. The telephony actions are preferably executed in the order of telephony instructions found in the contents of the server response. For example, an XML document may include the necessary verbs to carry out the telephony actions of reading text to a caller, monitoring keys pressed by the caller, and redirecting the caller to a new URI (i.e., an updated primary URI) using the pressed keys as part of the data within the new URI. Preferably, the telephony action (such as digits pressed) results in new state information, which may result in a repetition of some steps of the method, preferably beginning at Steps S120 or S130. The next URI is preferably provided by the server as part of the processing instructions. In another variation, the last URI is reused if the server fails to specify a next URI. In yet another variation, no repetition occurs if the server fails to specify a next URI, and processing continues below at the next call router instruction. The behavior may be determined by the nature of the call router instruction; for example, instructions that generate no new state information would not need to have a next URI since they don't trigger communication with a remote server. New state information may trigger an application event for the state change of the telephony session. A secondary URI and more specifically a status callback URI is preferably registered for a type of state change such as recording beginning or recording end. When a secondary URI is registered for a particular state change, then that state change will be detected in Step S150. The telephony actions preferably result in the repetition of step S130 with the new URI resulting from Step S140, but may alternatively initiate a repetition of one or more steps of the method. Step S130 is preferably repeated using all new phone session state information resulting from execution of a telephony action, such as digits pressed, a recorded audio file, or the success or failure of any telephony action requested. Repetition also includes all state information that remains relevant during the course of the session, such as Caller, Called, unique Call ID, and call status. The state information may also be represented in the form of a URI Template. For example, if the server response specifies that the call router should collect DTMF digits, and specifies that the next URL is the URI Template http://demo.twilio.com/foo.php?digits={Digits}, and the caller presses 1234, the resulting URI is http://demo.twilio.com/foo.php?digits=1234. Similarly, if the server response specifies the URI Template: http://demo.twilio.com/myapp/{Digits}.mp3, the resulting HTTP Request could be to a static mp3 file located at: http://demo.twilio.com/myapp/1234.mp3. Thus, a call may be controlled by one server that issued the telephony instruction and a second server that processes the response. Such call control hand-offs constitute the transfer of state information between servers in the form of a URI and accompanying request data, such as GET, POST, and/or request body. Preferably, all state communications conform to a syntax established by the call router to facilitate integration between multiple servers. For example, digits pressed on the keypad are preferably communicated to application servers in an identical fashion, thus minimizing the need for coordination between a multiple application servers with regard to how state is transferred. Alternatively, call router instructions may dictate the method of communicating new state information, such as the names and types of variables to send representing new state.

Step S150, which includes detecting an application event, functions to identify a trigger for use of a secondary URI. The application event may be an application error, a state change during a telephony session such as a particular telephony instruction or user action, or any suitable event. Detecting an application error functions to determine if the communication for a telephony application has encountered failure or fatal error. In one variation, the application error is a communication error. A communication error is preferably an inability to properly communicate with the application server. This may occur if the application server is not operating as shown in FIG. 2A. When the call router is attempting to send a request to the application server specified by the primary URI, a server error message is returned indicating a communication error has occurred. As another variation, the application error may be customer error. Customer error is an error in the operation of the telephony application due to malformed or improper messages from the application server as shown in FIG. 2B. This will commonly include syntax errors in the code of the application server. They may respond to a request with invalid or unparsable instructions. Other application errors may be any suitable error that occurs in a telephony application. The application event may alternatively be a state change such as a state change during a telephony session, a particular telephony instruction or user action, and/or any suitable event. State changes may include the start, end or changes in telephony sessions for transcripts, recordings, telephony session call flow, numbers dialed, buttons pressed, and/or any suitable aspect of a telephony session. A status callback URI may be registered for a particular type of event such as the ending of a recording, but may alternatively be for a plurality of types of events such as the start and end of any recording, transcription, and button input. Such events are preferably detected during the execution of the telephony instructions as described above, from user input, or through any suitable indicator of the state change.

Step S160, which includes communicating with the application server designated by the secondary URI upon application event, functions to use the secondary URI for handling aspects of the event. When application event triggers a secondary URI that is a fallback URI, the communication is preferably intended to handle an application error. When the secondary URI is a status callback URI, data related to the event is preferably sent to the service specified by the status callback URI. As mentioned above a plurality of secondary URIs may be assigned for an application. There may be a plurality of fallback URIs and/or a plurality of status callback URIs.

A fallback URI may be used to catch errors and recover or to gracefully inform a user in the telephony session of an error. Information about the telephony session is preferably included in the communication with the application server designated by the secondary URI. In one variation, the request last sent to the application server is preferably resent to the application server of the secondary URI. This will preferably include the same HTTP parameters, and may additionally include HTTP errors. Similar to how state is embedded in communication using the primary URI, state of the application at the time of the application error may be embedded in the secondary URI. The request may encapsulate at least a portion of the state information from the initiated telephony session, such as the originating phone number, the dialed phone number, the date and time of the call, geographic location of the caller (e.g. country, city, and/or state, zip), and/or the unique call ID. The request, more preferably, encapsulates all the state information of the call, but may alternatively include no state information or partial state information. The state information from the initiated telephony session is preferably sent via HTTP POST in the request body, HTTP GET in the request URI, HTTP header parameters to mimic the data flow of a web browser, or by any combination or suitable alternative way. Using the state information an application server may be capable of recovering the application state and proceed without ending a telephony session or starting over. In this variation, the fallback URI may result in communication that updates the primary URI. Or in other words, the telephony application may recover and continue with normal operation. Alternatively, a notification of the error may simply be sent to the secondary URI and a static response (e.g., an audio message informing user of the error) may be generically returned and played to the user before ending the call.

In the case of the communication error, the secondary URI is preferably hosted on a different server than that of the primary URI. The server of the secondary URI will ideally be operating even if the server of the primary URI stops operating. The server of the secondary URI may include a mirror or duplicate instance of the server of the primary URI. Thus when a communication error occurs control of the application may be moved over to the server of the secondary URI and proceed with normal operation from the perspective of the user without ending the telephony session.

In the case of customer error, the application server has provided malformed or improper messages from the application server or the application server has caused the telephony platform to halt execution of the telephony application. Similar to the communication error, the state information may be used to recover. However, the state information may alternatively be logged and used by the application developer in resolving errors in the application. Additionally, if the secondary URI fails another secondary URI may be used. Alternatively, a default error handling routine may be used within the telephony session. For example, a default message of the telephony platform may be played.

In the case of a state change application event, a telephony instruction, user action, or other indicator of the state change preferably has an associated status callback URI. Data associated with the state change is preferably communicated to an application server specified by the status callback URI. This status callback server may be operated by the same entity as the main application server, but may alternatively be operated by a third-party. The status callback server preferably receives the data and performs any suitable action. A reply is preferably not part of the communication, but continued communication between the telephony platform (e.g., call router) and the status callback server may occur. Preferably, the communication. In this variation, the telephony session is preferably uninterrupted, and the communication with the application server of the secondary URI (e.g., the status callback URI) happens in parallel to the communication with the application server of the primary URI. Some exemplary applications of a status callback URI would be to send data relating to audio recordings, transcriptions, telephony session call flow, numbers dialed, and/or any suitable aspect of a telephony session to a second application.

An alternative embodiment preferably implements the above methods in a computer-readable medium storing computer-readable instructions. The instructions are preferably executed by computer-executable components preferably integrated with a telephony platform preferably with a call router to mediate communication between telephony devices and an application server. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method comprising:

identifying, by a communication platform, a first Uniform Resource Identifier (URI) assigned to a first communication address, the first URI identifying a first application server system that is external to the communication platform;

providing communication services in relation to the first communication address based on communications with the first application server identified by the first URI;

in response to detecting occurrence of an event associated with the communication services provided in relation to the first communication address, identifying a second URI assigned to the first communication address, the second URI identifying a second application server system that is external to the communication platform; and providing communication services in relation to the first communication address based on communications with the second application server identified by the second URI.

2. The method of claim 1, further comprising:

receiving an incoming communication request directed to the first communication address, wherein the communication services provided in relation to the first communication address include establishing a communication session with a client device that initiated the incoming communication request.

3. The method of claim 1, wherein providing communication services in relation to the first communication address based on communications with the first application server identified by the first URI comprises:

transmitting a request for a set of communication instructions to the first application server, the request being based on the first URI, wherein detecting occurrence of the event associated with the communication services comprises receiving a server error message from the first application server in response to the request for the set of communication instructions, the server error message indicating that a communication error has occurred.

4. The method of claim 3, wherein providing communication services in relation to the first communication address based on communications with the second application server identified by the second URI comprises:

transmitting a subsequent request for the set of communication instructions to the second application server, the subsequent request being based on the second URI.

5. The method of claim 1, wherein providing communication services in relation to the first communication address based on communications with the first application server identified by the first URI comprises:

transmitting a request to the first application server to provide a service in relation to an established communication associated with the first communication address, the request being based on the first URI and being embedded with state information of the established communication session.

6. The method of claim 5, wherein detecting occurrence of the event associated with the communication services comprises detecting an error in the service being provided by the first application server relation to the established communication session.

7. The method of claim 6, wherein providing communication services in relation to the first communication address based on communications with the second application server identified by the second URI comprises:

transmitting a subsequent request to the second application server to provide the service in relation to the established communication associated with the first communication address, the subsequent request being based on the second URI and being embedded with updated state information of the established communication session.

8. The method of claim 1, wherein detecting occurrence of the event associated with the communication services comprises executing a command that is included in communication instructions received from the first application server, the command being to transmit state information to the second application server identified by the second URI.

9. The method of claim 8, wherein providing communication services in relation to the first communication address based on communications with the second application server identified by the second URI comprises:

transmitting a communication to the second application server, the communication being based on the second URI and being embedded with the state information of the established communication session.

10. A communication platform comprising:

one or more computer processors; and one or more computer-readable mediums storing instructions that, when executed by the one or more computer processors, cause the communication platform to perform operations comprising:

identifying a first Uniform Resource Identifier (URI) assigned to a first communication address, the first URI identifying a first application server system that is external to the communication platform;

providing communication services in relation to the first communication address based on communications with the first application server identified by the first URI;

in response to detecting occurrence of an event associated with the communication services provided in relation to the first communication address, identifying a second URI assigned to the first communication address, the second URI identifying a second application server system that is external to the communication platform; and providing communication services in relation to the first communication address based on communications with the second application server identified by the second URI.

11. The communication platform of claim 10, the operations further comprising:

receiving an incoming communication request directed to the first communication address, wherein the communication services provided in relation to the first communication address include establishing a communication session with a client device that initiated the incoming communication request.

12. The communication platform of claim 10, wherein providing communication services in relation to the first communication address based on communications with the first application server identified by the first URI comprises:

transmitting a request for a set of communication instructions to the first application server, the request being based on the first URI, wherein detecting occurrence of the event associated with the communication services comprises receiving a server error message from the first application server in response to the request for the set of communication instructions, the server error message indicating that a communication error has occurred.

13. The communication platform of claim 12, wherein providing communication services in relation to the first communication address based on communications with the second application server identified by the second URI comprises:

transmitting a subsequent request for the set of communication instructions to the second application server, the subsequent request being based on the second URI.

14. The communication platform of claim 10, wherein providing communication services in relation to the first communication address based on communications with the first application server identified by the first URI comprises:

transmitting a request to the first application server to provide a service in relation to an established communication associated with the first communication address, the request being based on the first URI and being embedded with state information of the established communication session.

15. The communication platform of claim 14, wherein detecting occurrence of the event associated with the communication services comprises detecting an error in the service being provided by the first application server relation to the established communication session.

16. The communication platform of claim 15, wherein providing communication services in relation to the first communication address based on communications with the second application server identified by the second URI comprises:

transmitting a subsequent request to the second application server to provide the service in relation to the established communication associated with the first communication address, the subsequent request being based on the second URI and being embedded with updated state information of the established communication session.

17. The communication platform of claim 10, wherein detecting occurrence of the event associated with the communication services comprises executing a command that is included in communication instructions received from the first application server, the command being to transmit status information to the second application server identified by the second URI.

18. The communication platform of claim 17, wherein providing communication services in relation to the first communication address based on communications with the second application server identified by the second URI comprises:

transmitting a communication to the second application server, the communication being based on the second URI and being embedded with the state information of the established communication session.

19. A non-transitory computer-readable medium storing instructions that, when executed by one or more computer processors of a communication platform system, cause the communication platform to perform operations comprising:

identifying a first Uniform Resource Identifier (URI) assigned to a first communication address, the first URI identifying a first application server system that is external to the communication platform;

providing communication services in relation to the first communication address based on communications with the first application server identified by the first URI;

in response to detecting occurrence of an event associated with the communication services provided in relation to the first communication address, identifying a second URI assigned to the first communication address, the second URI identifying a second application server system that is external to the communication platform; and providing communication services in relation to the first communication address based on communications with the second application server identified by the second URI.

20. The non-transitory computer-readable medium of claim 19, the operations further comprising:

receiving an incoming communication request directed to the first communication address, wherein the communication services provided in relation to the first communication address include establishing a communication session with a client device that initiated the incoming communication request.

* * * * *

UNITED STATES PATENT AND TRADEMARK OFFICE

CERTIFICATE OF CORRECTION

PATENT NO. : 11,032,330 B2
APPLICATION NO. : 16/851956
DATED : June 8, 2021
INVENTOR(S) : Lawson et al.

It is certified that error appears in the above-identified patent and that said Letters Patent is hereby corrected as shown below:

On the Title Page

On page 2, in Column 1, item (63) under "Related U.S. Application Data", Line 1, delete "15/841,481," and insert --15/841,781,-- therefor On page 8, in Column 1, item (56) under "Other Publications", Line 12, delete "Petworks"," and insert --Networks",-- therefor Signed and Sealed this
Second Day of November, 2021

Drew Hirshfeld
*Performing the Functions and Duties of the*
*Under Secretary of Commerce for Intellectual Property and*
*Director of the United States Patent and Trademark Office*